(12) United States Patent
Hoggarth et al.

(10) Patent No.: US 10,368,648 B2
(45) Date of Patent: Aug. 6, 2019

(54) DEPLOYABLE FOOTREST

(71) Applicant: Ford Global Technologies, LLC, Dearborn, MI (US)

(72) Inventors: Marcus Hoggarth, Hertfordshire (GB); Matthew Graeme Leck, Ruislip (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/950,501

(22) Filed: Apr. 11, 2018

(65) Prior Publication Data

US 2018/0338619 A1 Nov. 29, 2018

(30) Foreign Application Priority Data

May 23, 2017 (GB) .................................. 1708255.3

(51) Int. Cl.
| | |
|---|---|
| *B60N 3/06* | (2006.01) |
| *A47C 1/034* | (2006.01) |
| *A47C 7/50* | (2006.01) |
| *A47C 20/00* | (2006.01) |
| *B64D 11/06* | (2006.01) |
| *B60N 2/90* | (2018.01) |

(52) U.S. Cl.
CPC .............. *A47C 7/506* (2013.01); *B60N 2/995* (2018.02); *B60N 3/063* (2013.01); *B64D 11/0643* (2014.12)

(58) Field of Classification Search
CPC .... A47C 7/506; B64D 11/0643; B60N 2/995; B60N 3/063

USPC ......................................... 297/423.28, 423.3
See application file for complete search history.

(56) References Cited

U.S. PATENT DOCUMENTS

| | | | | |
|---|---|---|---|---|
| 402,130 | A * | 4/1889 | Bedford | A47C 3/0255 297/423.38 X |
| 2,918,964 | A * | 12/1959 | Braun | A47C 7/506 297/423.28 |
| 3,087,757 | A * | 4/1963 | Fidel | A47C 7/506 297/423.28 |
| 3,679,257 | A | 7/1972 | Jacuzzi et al. | |
| 4,013,318 | A | 3/1977 | Piper | |
| 4,455,050 | A * | 6/1984 | Kubek | A61G 5/12 297/423.28 X |
| 4,819,987 | A | 4/1989 | Stringer | |
| 5,188,383 | A * | 2/1993 | Thompson | A61G 5/08 297/423.1 X |
| 5,556,167 | A * | 9/1996 | Johnson Siemion | A47C 16/02 297/423.4 X |

(Continued)

FOREIGN PATENT DOCUMENTS

| | | |
|---|---|---|
| DE | 267425 A1 | 5/1989 |
| DE | 102010012767 A1 | 9/2011 |

(Continued)

*Primary Examiner* — Rodney B White
(74) *Attorney, Agent, or Firm* — Vichit Chea; Price Heneveld LLP (57) ABSTRACT

A deployable footrest assembly for a seat is provided. The deployable footrest assembly comprises a footrest movable between a stowed position and a deployed position in which the footrest presents a first surface for an occupant of the seat to rest their feet upon, wherein the footrest is bendable about an upstanding structural support for the seat such that the footrest is bent about the structural support in the stowed position.

18 Claims, 10 Drawing Sheets

(56) References Cited

U.S. PATENT DOCUMENTS

| | | | | |
|---|---|---|---|---|
| 5,782,535 A * | 7/1998 | Lafer | ................... | A47C 1/0342 297/423.28 |
| 5,795,017 A * | 8/1998 | Zimmerman | ........... | B63B 29/04 297/423.28 X |
| 5,890,766 A * | 4/1999 | Tsai | ................... | A47C 7/506 297/423.28 X |
| 5,918,942 A * | 7/1999 | Olsen | ................... | A47C 1/035 297/423.28 |
| 6,155,645 A * | 12/2000 | Bedrich | ................ | A47C 1/0355 297/423.28 X |
| 6,382,727 B1 * | 5/2002 | Pickard | ................. | A47C 7/506 297/423.3 X |
| 6,517,160 B2 * | 2/2003 | Marcantoni | ........... | A47C 7/506 297/423.28 |
| 6,619,748 B1 * | 9/2003 | Tseng | ................... | A47C 1/0347 297/423.3 |
| 6,832,741 B2 * | 12/2004 | Jarosz | .................. | B60N 3/063 244/118.5 |
| 7,080,887 B2 * | 7/2006 | Tseng | .................. | A47C 1/035 297/423.28 X |
| 7,108,329 B1 * | 9/2006 | Clough | ................ | B60N 3/063 297/423.19 |
| 7,322,655 B1 | 1/2008 | Williams et al. | | |
| 7,954,900 B2 * | 6/2011 | Shantha | .................. | B60N 3/06 297/423.4 X |
| 8,567,868 B2 * | 10/2013 | Kuno | .................... | B60N 2/995 297/423.3 |
| 8,794,706 B2 * | 8/2014 | Lin | ........................ | A47C 7/506 297/423.28 |
| 8,864,237 B2 * | 10/2014 | Long | ...................... | B60N 3/06 297/423.15 |
| 8,905,483 B2 * | 12/2014 | Block | ................... | B60N 3/004 297/423.4 X |
| 9,676,302 B2 * | 6/2017 | Yang | ....................... | B60N 2/28 |
| 10,166,902 B2 * | 1/2019 | Cayzer | .................. | B60N 2/995 |
| 2004/0094668 A1 | 5/2004 | Jarosz | | |
| 2006/0214478 A1 * | 9/2006 | Tsumura | ................ | A47C 4/48 297/30 |
| 2010/0244534 A1 * | 9/2010 | Driessen | ............... | B60N 3/063 297/423.3 X |
| 2012/0080912 A1 * | 4/2012 | Perera | ..................... | A47C 7/52 297/423.4 X |
| 2013/0285433 A1 * | 10/2013 | Yamada | ................. | B60N 2/995 297/423.3 |
| 2015/0305507 A1 * | 10/2015 | Besler | .................... | A47C 7/506 297/423.28 |
| 2015/0374133 A1 * | 12/2015 | Yin | ........................ | A47C 7/506 297/423.3 |

FOREIGN PATENT DOCUMENTS

| | | |
|---|---|---|
| JP | 2006042928 A | 2/2006 |
| WO | 2011112150 A1 | 9/2011 |

\* cited by examiner

DEPLOYABLE FOOTREST

FIELD OF THE INVENTION

The present invention generally relates to a deployable footrest, and more particularly, relates to a deployable footrest that is bendable about an upstanding structural support of a seat.

BACKGROUND OF THE INVENTION

Previously-proposed seats may have a footrest. However, it is desirable to be able to selectively stow a footrest in a manner that does not affect the utility of the seat.

SUMMARY OF THE INVENTION

According to one aspect of the present disclosure, there is provided a seat assembly comprising a seat and a deployable footrest assembly. The deployable footrest assembly includes a footrest movable between a stowed position and a deployed position in which the footrest presents a first surface for an occupant of the seat to rest feet upon. The footrest is bendable about an upstanding structural support for the seat such that the footrest is bent about the structural support in the stowed position.

The footrest may have a proximal end closest to the seat when in the deployed position and a distal end furthest from the seat when in the deployed position. The footrest may be configured to rotate between the stowed and deployed positions, e.g., such that the proximal end of the footrest may move to a position lower than the distal end of the footrest when in the stowed position. The footrest may be movable such that the first surface of the footrest faces the structural support when in the stowed position.

The footrest assembly may further comprise a support mechanism connected to the footrest and attachable to a seat assembly comprising the seat and structural support. The support mechanism may comprise an arm. A first end of the arm may be rotatably connectable to the seat assembly. The arm may be rotatable relative to the seat assembly about an axis parallel to a lateral direction of the seat. A second end of the arm may be rotatably connected to the footrest. The footrest may be rotatable relative to the arm about an axis parallel to the lateral direction of the seat. Rotation of the footrest relative to the arm may be limited by virtue of respective abutment surfaces on the footrest and arm that may engage when the footrest is in the deployed position.

The support mechanism may comprise a linkage configured such that rotation of the arm relative to the seat assembly causes the footrest to rotate relative to the arm, e.g., by virtue of a four bar link type mechanism or any other type of linkage. The support mechanism may comprise a first actuator configured to rotate the arm relative to the seat assembly. The support mechanism may comprise a second actuator configured to rotate the footrest relative to the arm.

The deployable footrest assembly may further comprise a controller, e.g., to control components of the deployable footrest assembly. The controller may be configured to selectively actuate the first actuator. The controller may be further configured to selectively actuate the second actuator. The controller may be further configured to actuate the first and second actuators when moving the footrest between the stowed and deployed positions. The first and second actuators may be actuated concurrently for at least a portion of their travel.

The footrest may have a midline extending from a proximal end of the footrest closest to the seat when in the deployed position to a distal end furthest from the seat when in the deployed position. The midline may be contained in a sagittal plane of the seat. The footrest may bend about one or more bending axes substantially parallel to or coincident with the midline. The footrest may bend about a plurality of bending axes, e.g., so as to form a curve when bent. The footrest may bend about the bending axes as the footrest moves between the deployed and stowed positions.

The footrest may be configured to be substantially flat in the deployed position. The footrest may be configured so as not to be bendable past the deployed position. The footrest may comprise one or more surfaces configured to limit bending movement past the deployed position.

The footrest may unfurl to a flat configuration by virtue of gravity. Additionally or alternatively, the deployable footrest assembly may comprise a mechanism configured to move the footrest into a bent configuration. The mechanism may be activated by movement of the footrest into the stowed position. The mechanism may comprise a cable that when retracted causes the footrest to move into the bent configuration. The mechanism may be activated by an actuator.

The first surface may be padded. The footrest may comprise a second surface opposite the first surface. The second surface may not be padded. The seat assembly may be a vehicle seat assembly.

According to a second aspect of the disclosure, a vehicle seat assembly is provided. The vehicle seat assembly includes a seat and a deployable footrest assembly. The deployable footrest assembly includes a footrest movable between a stowed position and a deployed position in which the footrest presents a first surface to rest feet, wherein the footrest is bendable about an upstanding structural support for the seat such that the footrest is bent about the structural support in the stowed position.

According to a third aspect of the present disclosure there is provided a method of stowing a footrest for a seat. The method includes moving the footrest from a deployed position, in which the footrest presents a first surface for an occupant of the seat to rest their feet upon, to a stowed position and bending the footrest about an upstanding structural support for the seat such that the footrest is bent about the structural support in the stowed position. The method may further comprise unbending the footrest, and moving the footrest to the deployed position.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1A:
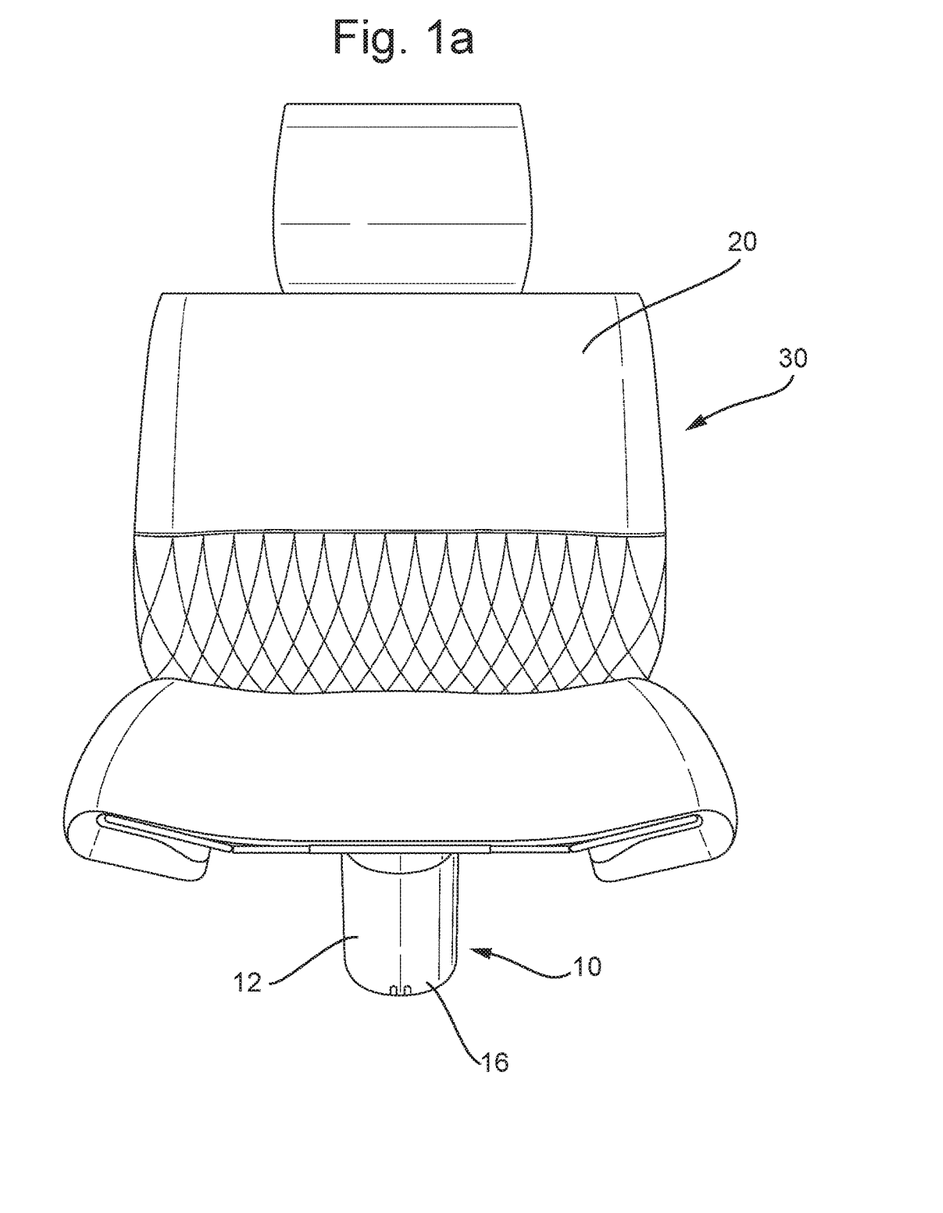
FIG. 1a is a front perspective view of a seat assembly having a deployable footrest in a first stowed position, according to one embodiment.
Figure 1B:
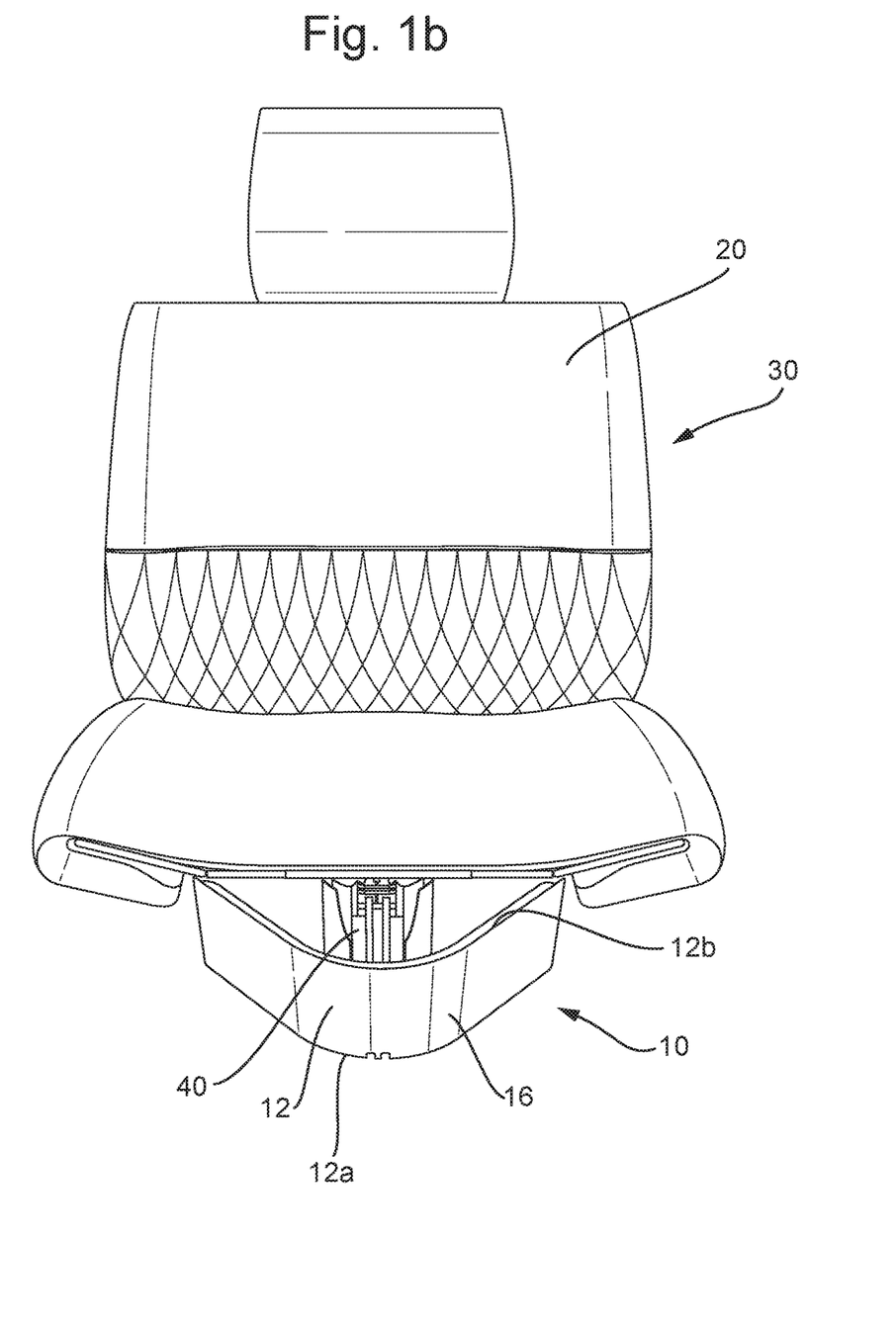
FIG. 1b is a front perspective view of the seat assembly having the deployable footrest in a second intermediate position.
Figure 1C:
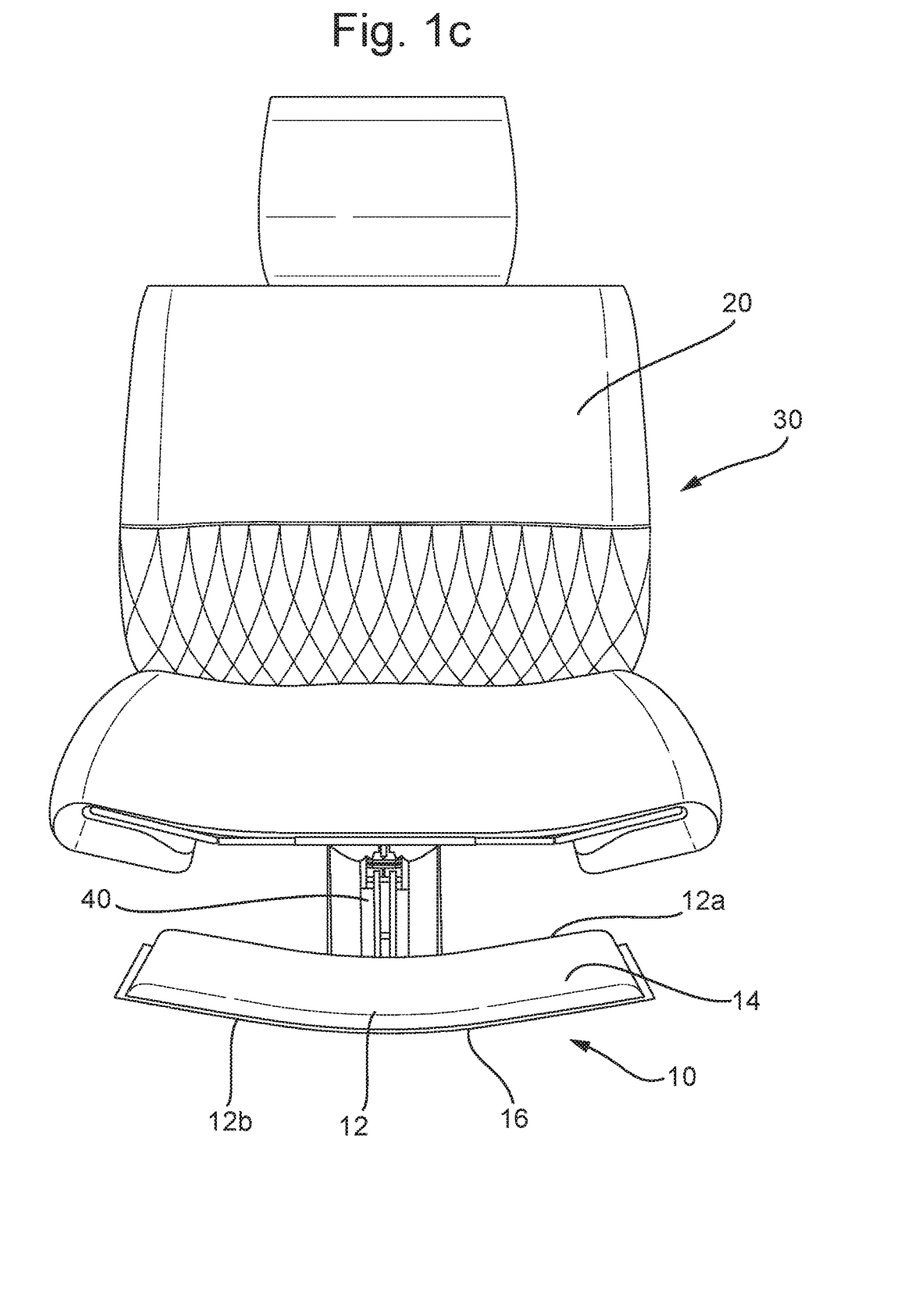
FIG. 1c is a front perspective view of the seat assembly having the deployable footrest in a third intermediate position.

With reference to FIGS. 1a-1d, the present disclosure relates to a deployable footrest assembly 10 for a seat 20. The deployable footrest assembly 10 and seat 20 may form part of a seat assembly 30. The footrest assembly 10 comprises a footrest 12, which is movable between a stowed position and a deployed position. FIGS. 1a-1d depict the progression of the footrest 12 from the stowed position (shown in FIG. 1a) to the deployed position (shown in FIG. 1d). FIGS. 1b and 1c depict intermediate positions between the stowed and deployed positions.

Figure 1D:
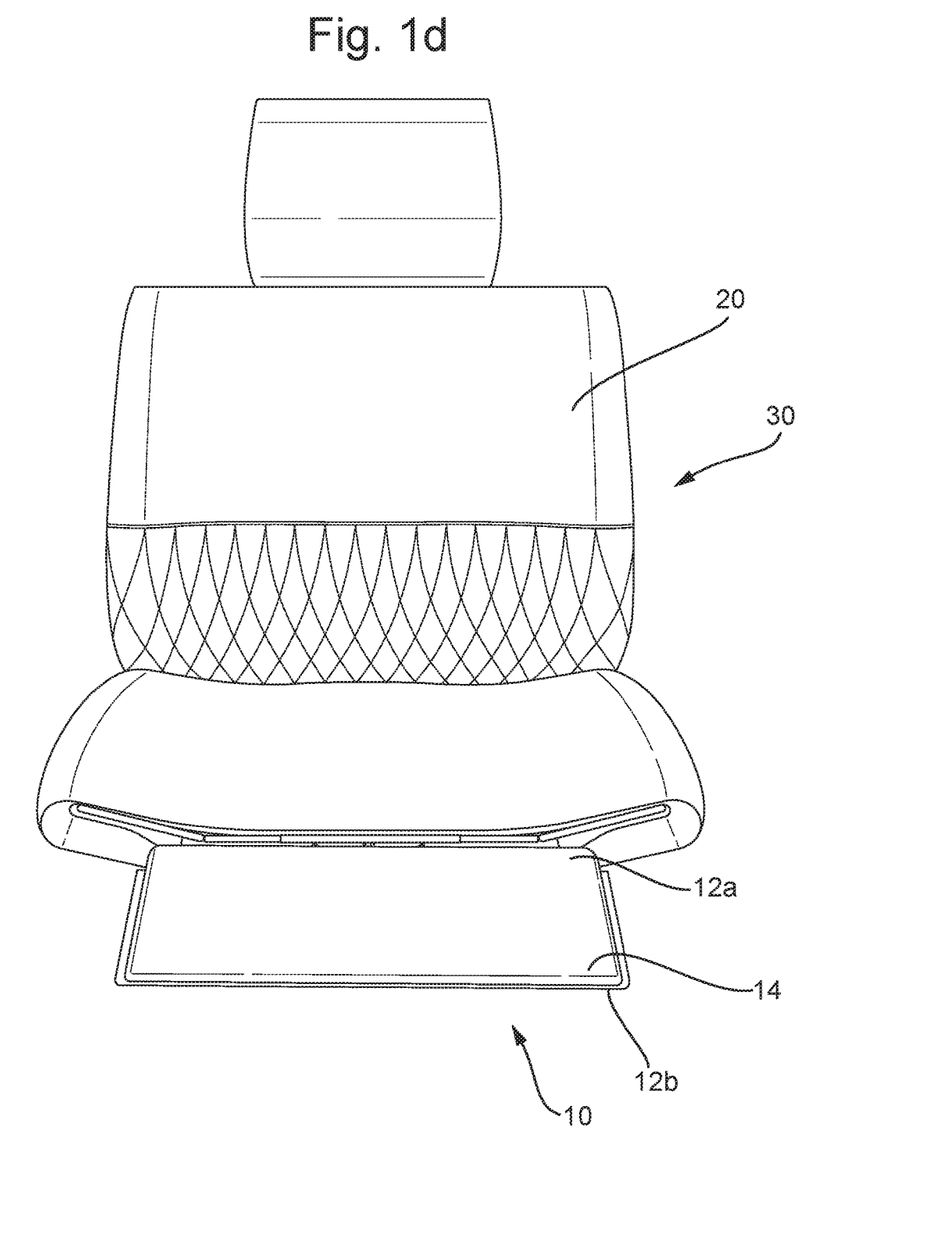
FIG. 1d is a front perspective view of the seat assembly having the deployable footrest in a fourth deployed position.

The footrest 12 is bendable and is in a bent configuration when in the stowed position (as shown in FIG. 1a) and a flat configuration when in the deployed position (as shown in FIG. 1d). The seat assembly 30 may comprise an upstanding structural support 40, which supports the seat 20. The footrest 12 may be bent about the structural support 40 when in the stowed position.

The footrest 12 comprises a first surface 14 upon which an occupant of the seat 20 may rest their feet. The footrest 12 may be movable such that the first surface 14 of the footrest 12 faces the structural support 40 when in the stowed position. So that the first surface 14 may face the structural support 40, the footrest 12 may rotate between the stowed and deployed positions. For example, the footrest 12 may have a proximal end 12a closest to the seat 20 when in the deployed position and a distal end 12b furthest from the seat 20 when in the deployed position and the proximal end 12a may move to be in a position lower than the distal end 12b when the footrest 12 is in the stowed position. In other words, the proximal end 12a may move downwards relative to the distal end 12b as the footrest 12 rotates from the deployed position to the stowed position.

The proximal end 12a of the footrest 12 may be adjacent to, e.g., touching, the seat 20 when in the deployed position. Additionally or alternatively, the footrest 12 may form a continuation of the seat 20 when in the deployed position, e.g., so as to provide an ergonomic surface to support the lower legs and/or feet of the occupant.

The first surface 14 of the footrest 12 may be padded, e.g., so as to provide a soft surface for the occupant of the seat to rest their feet or lower legs. The footrest 12 may comprise a second surface 16 opposite the first surface 14. In contrast to the first surface 14, the second surface 16 may not be padded. The second surface 16 may be flush with surrounding portions of the seat assembly 30 when the footrest 12 is in the stowed position.

Figure 2A:
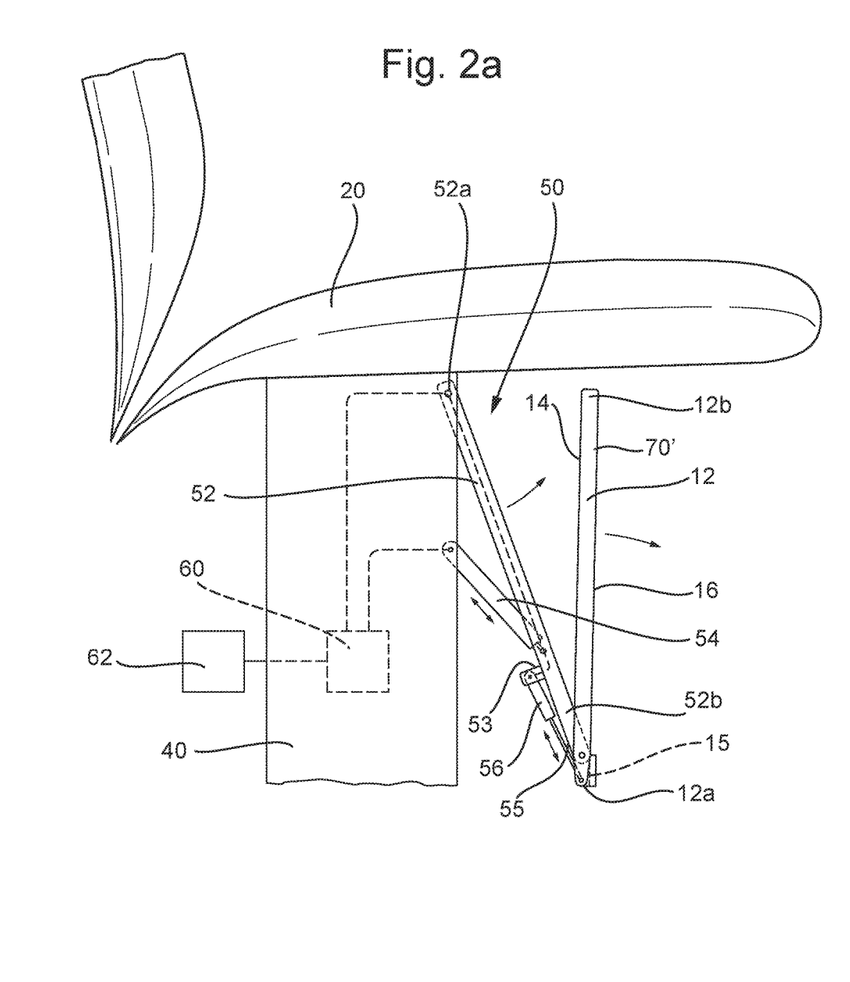
FIG. 2a is a side schematic view of the seat assembly with the footrest in the stowed position.
Figure 2B:
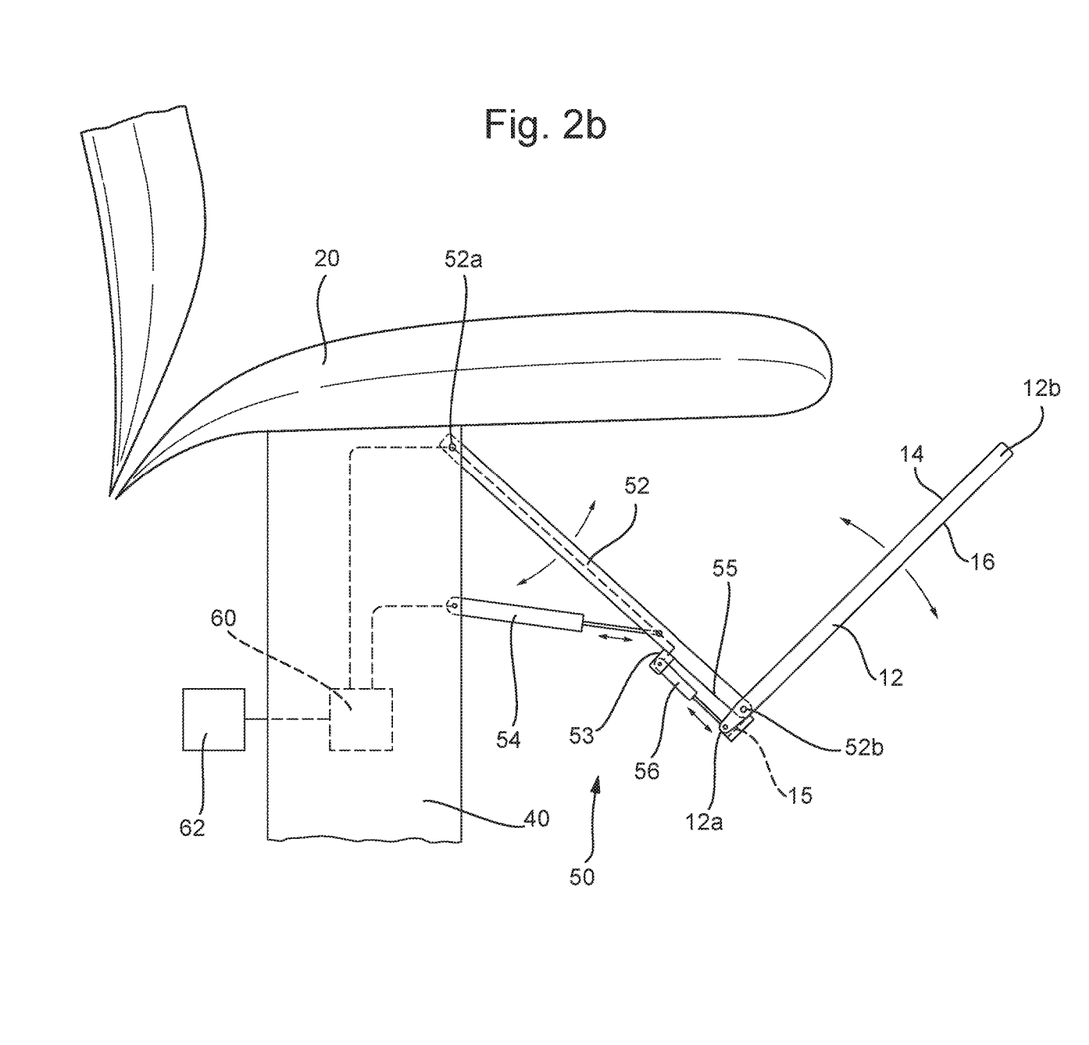
FIG. 2b is a side schematic view of the seat assembly with the footrest in an intermediate position.
Figure 2C:
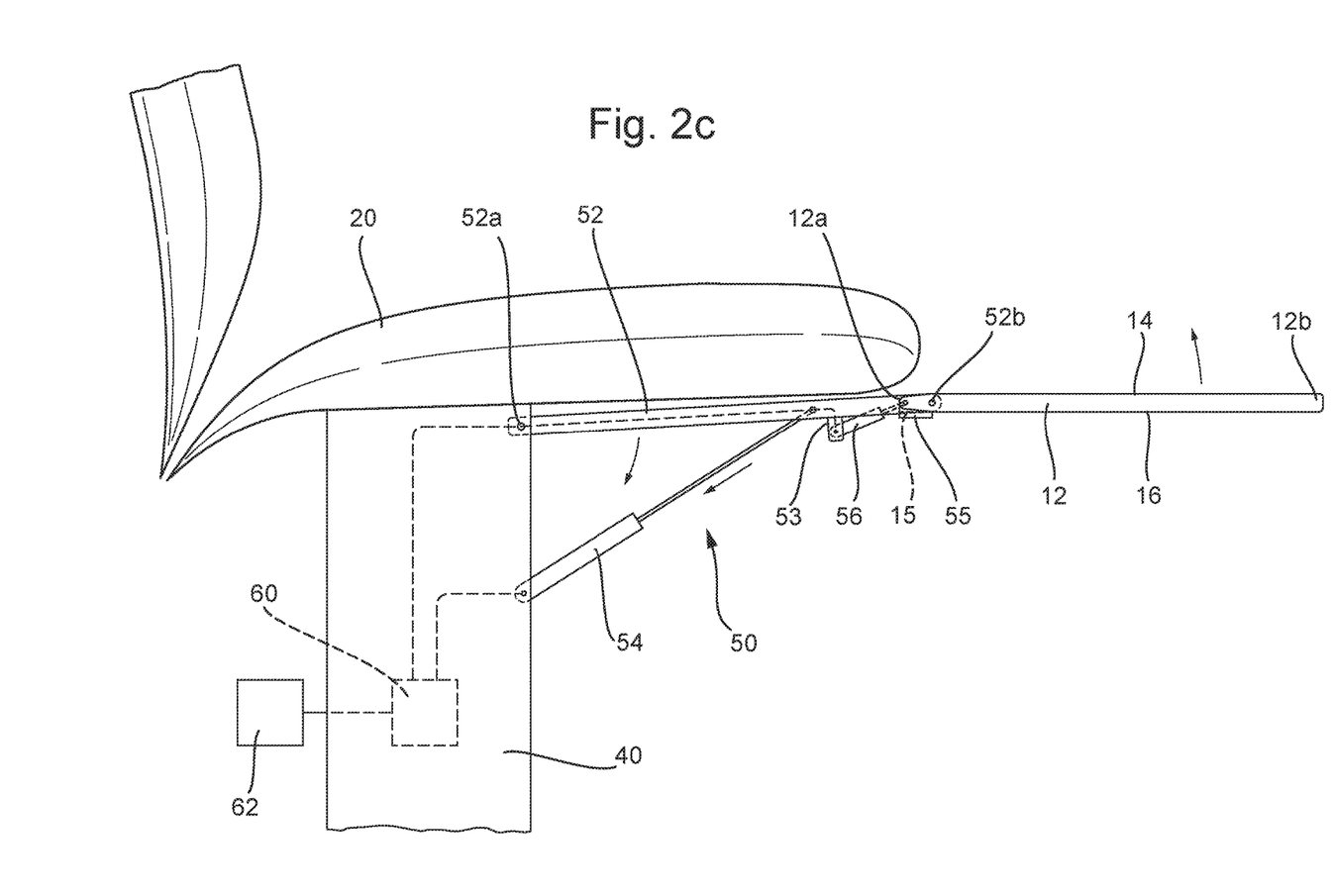
FIG. 2c is a side schematic view of the seat assembly with the footrest in the deployed position.

Referring now to FIGS. 2a-2c, the footrest assembly 10 may further comprise a support mechanism 50 configured to connect the footrest 12 to the seat assembly 30. The support mechanism 50 comprises an arm 52, which is elongate and has a first end 52a and a second end 52b. The first end 52a is rotatably coupled to the seat assembly 30. For example, the first end 52a of the arm 52 may be rotatably coupled to the structural support 40, e.g., at or towards a top end of the structural support. The arm 52 may rotate relative to the seat assembly 30 about an axis that is parallel to a lateral direction of the seat 20. The arm 52 may be rotatably coupled to the footrest 12 at or near the second end 52b of the arm. In particular, the arm 52 and the footrest 12 may be rotatably coupled at a point that is set back from the proximal end 12a of the footrest 12. As for the first end, the arm 52 may rotate relative to the footrest 12 about an axis parallel to the lateral direction of the seat 20.

The support mechanism 50 may comprise a first actuator 54 configured to rotate the arm 52 relative to the seat assembly 30. For example, the first actuator 54 may be a linear actuator. One end of the first actuator 54 may be coupled to the structural support 40 and another end of the first actuator may be coupled to the arm 52. Accordingly, extension and retraction of the first actuator may cause the arm 52 to rotate relative to the seat assembly 30. FIGS. 2a-2c depict the progressive rotation of the arm 52 as the first actuator extends. Although FIGS. 2a-2c shows the actuator 54 being a linear actuator, it is also envisaged that the actuator may take another form, e.g., a rotary motor or any other type of actuator.

The support mechanism 50 may further comprise a second actuator 56 configured to rotate the footrest 12 relative to the arm 52. As depicted, the second actuator 56 may be a linear actuator, an end of which is connected to the arm 52 and the opposite end connected to the footrest 12. The second actuator 56 is coupled closer to the proximal end 12a of the footrest 12 than the arm 52. The second actuator 56 may also be coupled to the arm 52 via a projection 53 extending from the arm 52 so that the second actuator may be coupled to the arm 52 at a point spaced apart from a longitudinal axis of the arm. The projection 53 may improve the leverage of the second actuator 56. As the second actuator 56 is retracted, the footrest 12 rotates away from the arm 52. Accordingly, the arm 52 and footrest 12 may move from the stowed position, in which the arm 52 and footrest 12 are disposed at an acute angle relative to each other, to the deployed position in which the arm 52 and footrest 12 are at a non-acute angle (e.g., an obtuse angle). FIGS. 2a-2c depict the progression of the rotation of the footrest 12 relative to the arm 52 from the stowed position to the deployed position. Although FIGS. 2a-2c depict the second actuator 56 being a linear actuator, it is also envisaged that the second actuator may be a rotary actuator, such as a motor or any other type of actuator.

In an alternative arrangement, the support mechanism 50 may comprise a linkage that is configured so that rotation of the arm relative to the seat assembly causes the footrest to rotate relative to the arm. For example, such a linkage may comprise a four bar link type mechanism or any other type of linkage. In this way, the second actuator 56 may be omitted and the first actuator 54 may drive rotation of both the arm relative to the seat assembly and the footrest relative to the arm.

Rotation of the footrest 12 relative to the arm 52 may be limited by virtue of respective abutment surfaces 15, 55 on the footrest and arm that engage when the footrest is in the deployed position. Engagement of the abutment surfaces 15, 55 may prevent rotation of the footrest past the deployed position.

Referring still to FIGS. 2a-2c, the deployable footrest assembly 10 may further comprise a controller 60 to control components of the deployable footrest assembly. The controller 60 may be operatively coupled to the first actuator 54 so as to selectively actuate the first actuator. In the case of the second actuator 56 being provided, the controller 60 may also be operatively coupled to the second actuator to selectively actuate the second actuator. The controller 60 may be operatively coupled to a user input device 62, which an occupant of the seat 20 may interface with to select the desired position of the footrest 12.

The controller 60 may be configured to actuate the first and second actuators 54, 56 so as to move the footrest 12 between the stowed and deployed positions. In particular, the controller 60 may control the movement of the arm 52 and footrest 12 to allow the footrest assembly to move between the deployed and stowed positions. For example, the first and second actuators 54, 56 may be actuated at the appropriate rates and/or concurrently for at least a portion of their travel so that the footrest 12 does not impinge upon an underside of the seat 20.

Figure 3A:
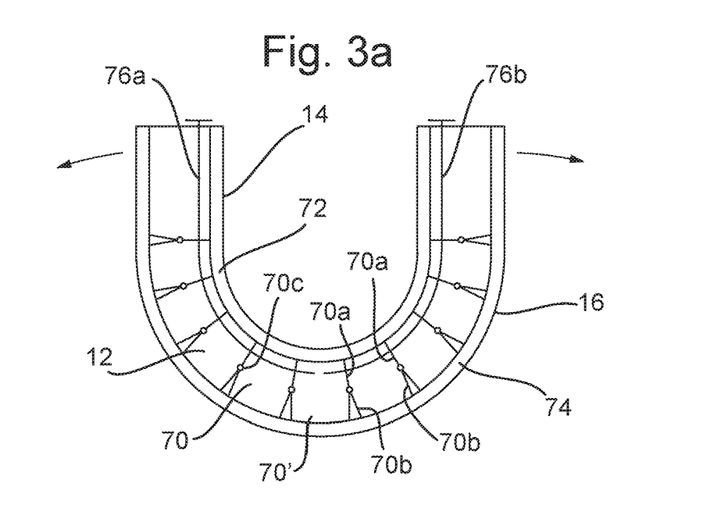
FIG. 3a is a schematic end on view of the footrest with the footrest in a bent configuration.
Figure 3B:
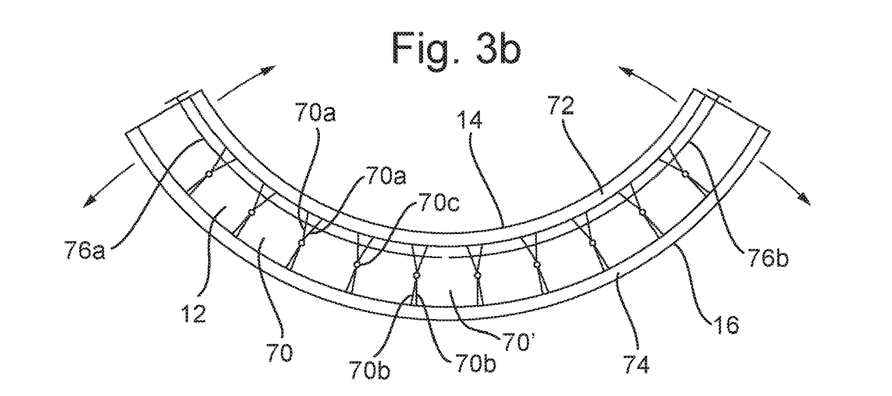
FIG. 3b is a schematic end on view of the footrest with the footrest in an intermediate configuration.
Figure 3C:
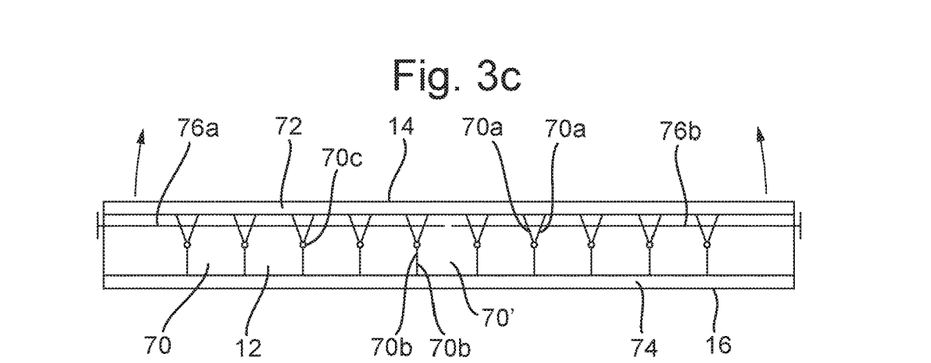
FIG. 3c is a schematic end on view of the footrest depicting the footrest in a flat configuration.
Figure 4A:
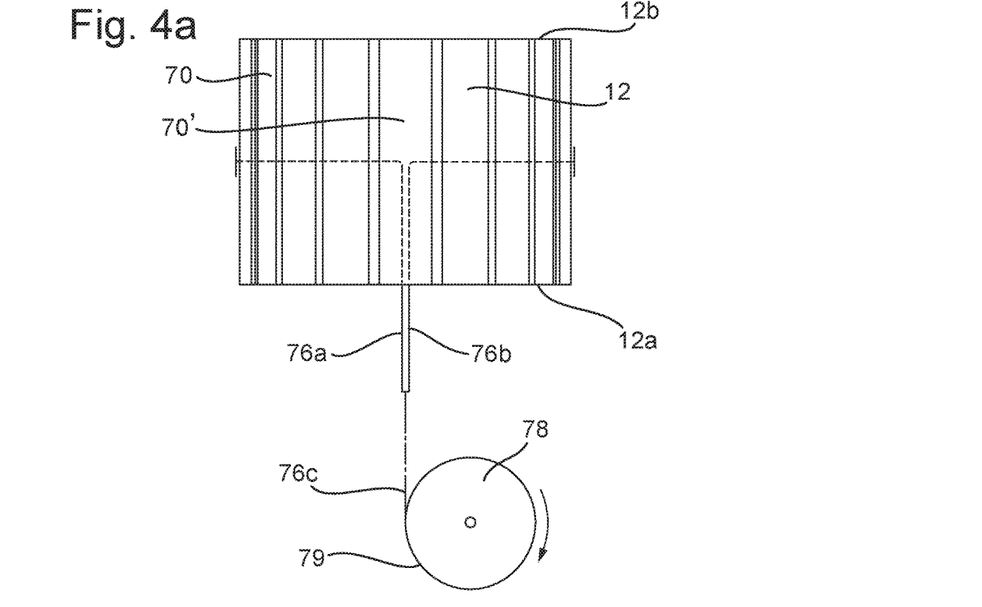
FIG. 4a is a schematic plan view of the footrest according to the arrangement of the present disclosure with the footrest in a bent configuration.
Figure 4B:
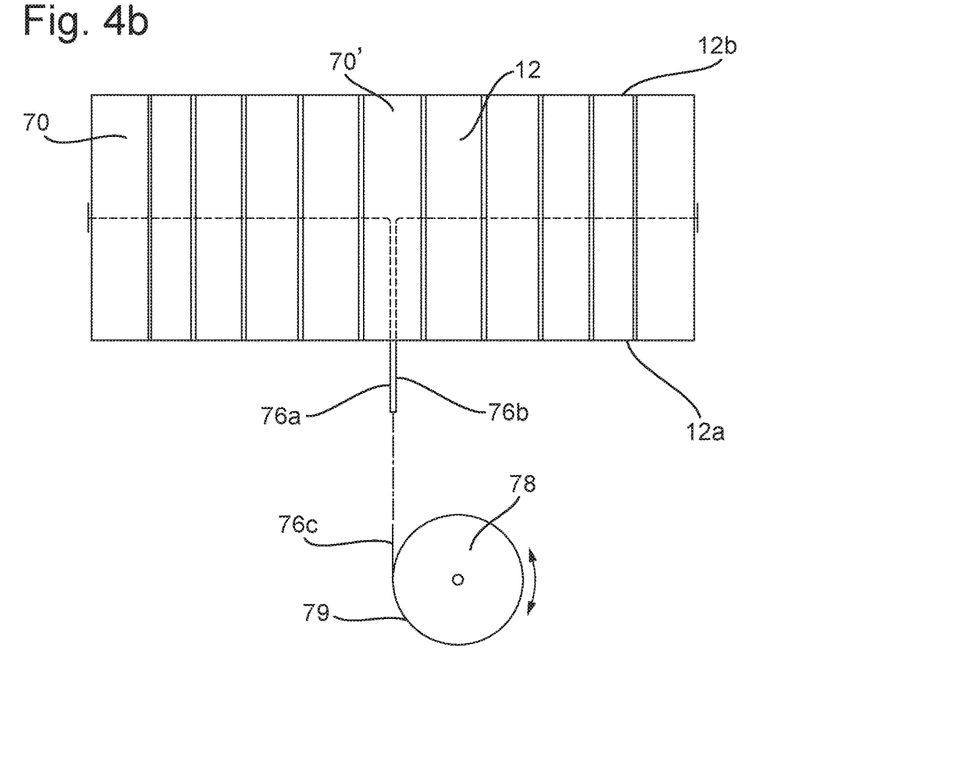
FIG. 4b is a schematic plan view of the footrest according to the arrangement of the present disclosure with the footrest in an intermediate configuration.
Figure 4C:
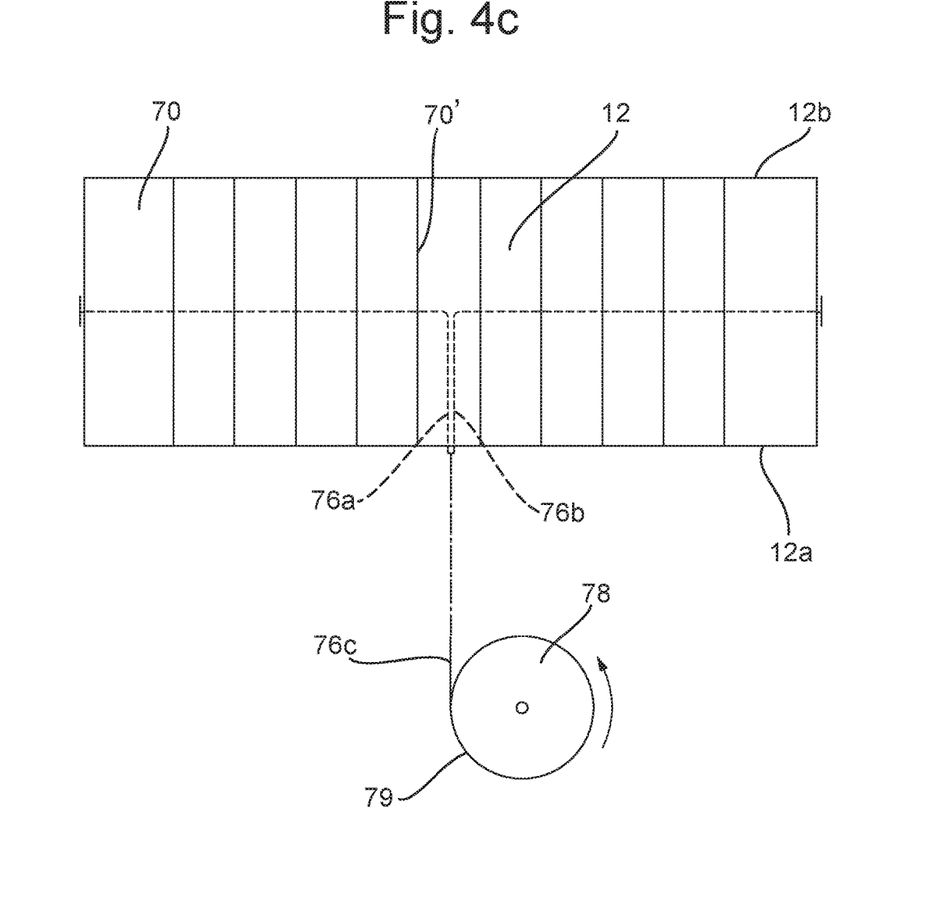
FIG. 4c is a schematic plan view of the footrest according to the arrangement of the present disclosure with the footrest in the flat configuration.

Referring now to FIGS. 3a-3c and 4a-4c, the footrest 12 will be described in further detail. As mentioned above, the footrest 12 may move between a bent configuration (as depicted in FIGS. 3a and 4a) and a substantially flat configuration (as depicted in FIGS. 3c and 4c). FIGS. 3b and 4b depict an intermediate configuration between the bent and flat configurations. FIGS. 4a-4c depict a plan view of the footrest 12 as the footrest moves from the bent configuration to the flat configuration and corresponds to the views shown in FIGS. 3a-3c respectively.

The footrest 12 may comprise a plurality of elongate members 70, which extend from the proximal end 12a of the footrest to the distal end 12b. Each of the elongate members may be rotatably coupled to an adjacent one of the elongate members. The plurality of elongate members may be arranged in a side-by-side fashion. Accordingly, the footrest 12 may bend about a plurality of bending axes so as to form a curve when bent.

The footrest 12 may comprise a first layer 72 on a first side of the elongate members 70. The first layer 72 may provide the first surface 14. The first layer may comprise resistant, e.g., padded material. In a similar manner, the footrest 12 may comprise a second layer 74 on a second side of the elongate member 70. The second layer 74 may provide the second surface 16. The first and/or second layers 72, 74 may expand and/or contract as the footrest 12 moves between the bent and flat configurations. The first and/or second layers may be attached to each or particular ones of the plurality of elongate members 70.

Each of the elongate members 70 may comprise upper abutment side surfaces 70a that may be configured to abut one another when the footrest is in the bent configuration. The upper abutment surfaces 70a may otherwise move apart when the footrest 12 moves away from the bent configuration. Additionally or alternatively, each of the elongate members 70 may comprise lower abutment side surfaces 70b that may abut when the footrest 12 is in the flat configuration. The lower abutment surfaces 70b may otherwise move apart as the footrest 12 moves away from the flat configuration.

Each elongate member 70 may comprise a pair of upper abutment surfaces 70a on opposite sides of the elongate member, with each upper abutment surface 70a facing a neighboring elongate member 70. Similarly, each of the elongate members 70 may comprise a pair of lower abutment surfaces 70b on either side of the elongate member, with each of the lower abutment surfaces facing an adjacent elongate member 70. The lower abutment surfaces 70b of a particular elongate member 70 may be substantially parallel to each other. In this way, abutment of the lower abutment surfaces 70b may limit rotation of the elongate members 70 past the flat configuration. By contrast, the upper abutment surfaces 70a of a particular elongate member 70 may be non-parallel, e.g., tapered, such that the upper abutment surfaces 70a abut in the bent configuration of the footrest.

The elongate members 70 may be successively rotatably coupled to one another by virtue of couplings 70c. In particular, the elongate members 70 may be rotatably coupled to a neighboring elongate member 70 at the transition between the upper and lower abutment surfaces 70a, 70b.

The width of the elongate members 70 may be the same or may vary. In the example shown, the elongate members 70 at the lateral edges of the footrest 12 may be wider than the elongate members away from the lateral edges. As such, the footrest 12 may form a "U" shape when bent.

The footrest 12 may further comprise first and second cable portions 76a, 76b. The first and second cable portions 76a, 76b may pass through successive ones of the elongate members 70. In particular, the first and second cable portions 76a, 76b may pass through an upper region of the elongate members 70 comprising the upper abutment surfaces 70a. The first cable portion 76a may be provided on a first lateral side of the footrest 12 and the second cable portion 76b may be provided on a second lateral side of the footrest 12. The first and second cable portions 76a, 76b may extend laterally, e.g., from a mid-point of the footrest to the lateral ends of the footrest. The first and second cable portions 76a, 76b may slidably pass through the elongate members 70. Distal ends of the first and second cable portions 76a, 76b may be coupled to the elongate members 70 at the lateral ends of the footrest. The first and second cable portions 76a, 76b may come together in a central elongate member 70' in which the first and second cable portions may extend in a longitudinal direction of the elongate member 70'. The central elongate member 70' may correspond to the portion of the footrest 12 depicted in FIGS. 2a-c.

The first and second cable portions 76a, 76b may be coupled to a third actuator 78 configured to selectively pull the first and second cable portions 76a, 76b. For example, the third actuator 78 may comprise a motor with a reel 79 about which the first and second cable portions 76a, 76b or a further cable portion 76c connected to the first and second cable portions is wound. The first and second cable portions 76a, 76b and/or the further cable portion 76c may pass through the arm 52 and extend into the seat assembly 30, e.g., into the support structure 40. The third actuator 78 may then be provided in the support structure 40.

Rotation of the motor may pull the first and second cable portions 76a, 76b. As the first and second cable portions 76a, 76b are spaced apart from the pivot points between neighboring elongate members 70, the pulling force causes the footrest 12 to move into the bent configuration. By contrast, unwinding the drum 79 may permit the footrest 12 to move into the flat configuration. The footrest assembly 10 may at least partially rely on gravity to move the footrest 12 into the flat configuration as the footrest 12 is moved into the deployed position. The third actuator 78 may unwind the first and second cable portions 78a, 78b (or further cable portion 78c) gradually as the footrest 12 moves into the deployed position to provide a smooth transition as gravity urges the footrest into the substantially flat configuration. When it is desired to move the footrest 12 into the stowed position, the third actuator 78 may be activated so as to move the footrest 12 into the bent configuration. The third actuator 78 may be operatively coupled to the controller 60 and activated by the controller at the appropriate time.

It will be appreciated by those skilled in the art that although the invention has been described by way of example, with reference to one or more examples, it is not limited to the disclosed examples and alternative examples may be constructed without departing from the scope of the invention as defined by the appended claims.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seat assembly comprising:
    a seat; and
    a deployable footrest assembly comprising:
        a footrest movable between a stowed position and a deployed position in which the footrest presents a first surface for feet of an occupant of the seat to rest upon,
        wherein the footrest is bendable about an upstanding structural support for the seat such that the footrest is bent about the structural support in the stowed position, wherein the footrest has a proximal end closest to the seat when in the deployed position and a distal end furthest from the seat when in the deployed position, and wherein the footrest configured to rotate between the stowed and deployed positions such that the proximal end of the footrest moves to a position lower than the distal end of the footrest when in the stowed position.

2. The seat assembly of claim 1, wherein the footrest is movable such that the first surface of the footrest faces the structural support when in the stowed position.

3. The seat assembly of claim 1, wherein the footrest assembly further comprises a support mechanism connected to the footrest and attachable to a seat assembly comprising the seat and structural support.

4. The seat assembly of claim 3, wherein the support mechanism comprises an arm, a first end of the arm being rotatably connectable to the seat assembly and a second end of the arm being rotatably connected to the footrest.

5. The seat assembly of claim 4, wherein rotation of the footrest relative to the arm is limited by respective abutment surfaces on the footrest and arm that engage when the footrest is in the deployed position.

6. The seat assembly of claim 4, wherein the support mechanism comprises a linkage configured such that rotation of the arm relative to the seat assembly causes the footrest to rotate relative to the arm.

7. The seat assembly of any of claim 4, wherein the support mechanism comprises a first actuator configured to rotate the arm relative to the seat assembly.

8. The seat assembly of any of claim 7, wherein the support mechanism comprises a second actuator configured to rotate the footrest relative to the arm, wherein the deployable footrest assembly further comprises a controller configured to selectively actuate the first actuator and the second actuator, wherein the controller is further configured to actuate the first and second actuators when moving the footrest between the stowed and deployed positions, and wherein the first and second actuators are actuated concurrently for at least a portion of their travel.

9. The seat assembly of claim 1, wherein the footrest has a midline extending from a proximal end of the footrest closest to the seat when in the deployed position to a distal end furthest from the seat when in the deployed position and the footrest bends about one or more bending axes substantially parallel to or coincident with the midline.

10. The seat assembly of claim 9, wherein the footrest bends about a plurality of bending axes so as to form a curve when bent, and wherein the footrest bends about the bending axes as the footrest moves between the deployed and stowed positions.

11. The seat assembly of claim 1, wherein the footrest is configured to be substantially flat in the deployed position.

12. The seat assembly of claim 1, wherein the footrest is configured so as not to be bendable past the deployed position.

13. The seat assembly of claim 1, wherein the footrest unfurls to a flat configuration by virtue of gravity.

14. The seat assembly of claim 1, wherein the deployable footrest assembly comprises a mechanism configured to move the footrest into a bent configuration, and wherein the mechanism is activated by movement of the footrest into the stowed position.

15. The seat assembly of claim 1, wherein the first surface is padded, and wherein the footrest comprises a second surface opposite the first surface, the second surface not being padded.

16. The seat assembly of claim 1, wherein the seat is a vehicle seat.

17. A seat assembly comprising:
    a seat; and
    a deployable footrest assembly comprising:
        a footrest movable between a stowed position and a deployed position in which the footrest presents a first surface for feet of an occupant of the seat to rest upon, wherein the footrest is bendable about an upstanding structural support for the seat such that the footrest is bent about the structural support in the stowed position, and wherein the footrest is movable such that the first surface of the footrest faces the structural support when in the stowed position.

18. A seat assembly comprising:
    a seat; and
    a deployable footrest assembly comprising:
        a footrest movable between a stowed position and a deployed position in which the footrest presents a first surface for feet of an occupant of the seat to rest upon, wherein the footrest is bendable about an upstanding structural support for the seat such that the footrest is bent about the structural support in the stowed position;
        a support mechanism connected to the footrest and attachable to a seat assembly comprising the seat and structural support, wherein the support mechanism comprises an arm, a first end of the arm being rotatably connectable to the seat assembly and a second end of the arm being rotatably connected to the footrest, and wherein the support mechanism comprises a first actuator configured to rotate the arm relative to the seat assembly and a second actuator configured to rotate the footrest relative to the arm; and a controller configured to selectively actuate the first actuator and the second actuator, wherein the controller is further configured to actuate the first and second actuators when moving the footrest between the stowed and deployed positions, and wherein the first and second actuators are actuated concurrently for at least a portion of their travel.

* * * * *